United States Patent Office 3,216,926
Patented Nov. 9, 1965

3,216,926
PETROLEUM RESIN PROCESS
Stewart S. Kurtz, Jr., Merion Station, and Melvin E. Peterkin, Brook Haven, Pa., assignors to Sun Oil Company, Philadelphia, Pa., a corporation of New Jersey
No Drawing. Filed Sept. 12, 1963, Ser. No. 308,337
13 Claims. (Cl. 208—282)

This application is a continuation-in-part of our applications Serial No. 117,797, filed June 19, 1961; Serial No. 130,265, filed August 9, 1961; and Serial No. 191,260, filed April 30, 1962. These applications are abandoned.

This invention relates to the production of resins. More particularly it relates to the catalytic condensation of an aromatic hydrocarbon containing fraction with some form of formaldehyde to produce one or more resin fractions.

In the past various aromatic hydrocarbon feeds have been condensed with formaldehyde in the presence of such catalysts as $H_2SO_4$, $AlCl_3$, HF, and formic acid. The reaction has come to be known as the formolite reaction.

It is the general object of this invention to provide a process for making petroleum resins utilizing novel and efficient catalysts. A more particular object of the invention is to provide a process for converting low value petroleum refinery streams to relatively high value petrochemical products. A still further object of the invention is to provide a process which produces a light oil, a soft resin, an intermediate resin and a hard resin, the amounts of which may be varied by changing conditions and ingredient ratios.

Another object of the invention is to purify or upgrade a hydrocarbon fraction/or a mixture of hydrocarbon fractions by treating the material in the process of the invention.

In one embodiment aromatics, particularly dicyclic aromatics are removed from hydrocarbon fractions intended to be used as gas turbine or jet fuels. Gas turbine and jet fuels are made to meet certain specific standards set forth by military and commercial fuel users. These standards cover boiling range, volatility, gravity, heat of combustion, freezing point, solids content, gum, aromatics content, smoke point and others. Examples of these values are set forth in Petroleum Products Handbook, Guthrie, ed. 1960, McGraw-Hill pages 5–6 to 5–23. Aromatic hydrocarbons adversely effect many of the characteristics of jet fuels and most specifications call for less than 10 vol. percent aromatic hydrocarbons and the newer specifications call for less than 5 vol. percent aromatic hydrocarbons. The specifications also call for a low smoke point. We have found that the treating process described herein produces an improved jet fuel. We have further found that the reaction product produced in our process is the source of an excellent plasticizer for use with polyvinyl chloride and dioctyl phthalate.

In still another embodiment a hydrocarbon lubricating oil fraction is blended with a gas oil fraction and the mixed feed is treated in the process of the invention. In conventional refining of lubricating oils with chemical reagents, generally sludge is formed and there is a substantial loss of oil in the treatment. This embodiment of the invention provides a refining process whereby the amount of refined lubricating oil produced can be at least as much and even substantially more than the amount of lubricating oil charged to the process. The resulting lubricating oil product has considerably improved color and color stability as compared to the original oil and is useful for special applications, for example, as electrical oils and rubber processing oils. Additionally high melting resins useful in special applications are produced in the process.

We have discovered that complexes of $BF_3$ with formic acid and complexes of $BF_3$ with acetic acid are excellent catalysts for the preparation of petroleum resins.

Generally speaking, the process of the invention comprises reacting some form of formaldehyde with a petroleum hydrocarbon fraction containing aromatics in the presence of a catalyst complex comprising $BF_3$ and an acid selected from the group consisting of acetic acid and formic acid and recovering the resin product.

The reaction which takes place is a condensation reaction involving the aromatic hydrocarbons in the feed and the formaldehyde under the influence of the catalyst. The resins produced are short chain polymers having 2 to 4 aromatic groups per chain with methylene linkage and/or ester linkages. The resin fraction is soluble in many common hydrocarbon solvents such as benzene, toluene, xylenes and also in acetone and other ketones. The resin is insoluble in alcohol and water.

The feedstock employed depends on the particular embodiment being practiced. All the feedstocks contain aromatic hydrocarbons. The term "aromatic hydrocarbon fraction" is employed in this specification in the broad sense. The fraction can contain from 5 to 100 vol. percent aromatic hydrocarbons. When the primary objective is to produce a maximum of resin product or a resin having particular characteristics the feed will contain a very substantial amount of aromatic hydrocarbons i.e. from 30–100 vol. percent. When the primary objective is to upgrade or purify a certain fraction, the quantity of aromatics will generally be less i.e. 5–50 vol. percent aromatics; however these stated percentages are not intended to be limiting. In every case the function of the process is to condense the aldehyde with the aromatic hydrocarbons to produce resins which can be separated from the unreacted material.

Suitable feedstocks include pure or essentially pure aromatic hydrocarbons having 1–3 aromatic rings and the rings can be unsubstituted or substituted with 1–4 alkyl groups containing from 1–4 carbon atoms per group. Specific examples of the pure aromatic hydrocarbons include benzene, toluene, xylenes, substituted and unsubstituted naphthalenes, tetralins and indanes. Mixtures of these can also be used. Another type of feedstock can be obtained from petroleum refinery streams. Examples include thermal and catalytically cracked fractions and cycle streams, hydroformer bottoms, No. 2 fuel oil, aromatic distillates, aromatic solvent extracts or raffinates, naphthalene plant streams and the like. A particularly desirable material is the gas oil from catalytic cracking and boiling in the range of from 450 to 650° F. However, feedstocks boiling in the range of from about 200 to 900° F. can be used. The 450 to 650° F. fraction contains from 15 to 50 percent aromatics, the majority of the aromatics being di- or tricyclic.

When the primary processing objective is to remove aromatics from a jet fuel this type of feed is used. Suitable jet fuel type feed stocks are those containing a high percentage of saturated hydrocarbons i.e. paraffins, iso-paraffins and naphthenes and a low percentage of aromatics. The olefinic type of unsaturated hydrocarbon is normally absent in jet fuel feed stock. If present, olefins will probably require a substantial increase in the amount of catalyst needed, but would otherwise not interfere. Suitable feeds include those containing from about 70 to about 95 vol. percent saturated hydrocarbons and from about 5 to about 30% aromatics, and boiling in the range of from about 125 to 600° F., preferably boiling in the range of from about 300° F. to about 500° F. Sources of the feed include, but are not limited to straight run distillates, kerosines, solvent extracts, alkylates and stabilized cracked stocks. These can be combined and proportioned in the usual manner to approach jet fuel specifications. Off grade jet fuels, particularly those containing 5–30 vol. percent aromatics can be greatly improved by the process of the invention.

When the primary processing objective is to upgrade a lubricating oil a suitable lubricating oil is blended with a suitable gas oil fraction to establish the feedstock. Lubricating oils prepared by distillation and or solvent extraction having boiling ranges of 500–1,000° F. and containing paraffins, naphthenes and undesirably large amounts of aromatics can be used. Gas oil fractions like those mentioned previously are blended with the lubricating oil to prepare feedstocks containing from about 20 to about 70 vol. percent aromatic hydrocarbons.

Taking into consideration all the feedstocks mentioned the boiling range can be from 150–1,100° F. and the aromatic content can range from 5 to 100 vol. percent.

Any aldehyde or other carbonyl group containing compound which condenses with aromatic hydrocarbons can be used to effect the condensation. Acyclic, cyclic, heterocyclic, saturated, unsaturated substituted and unsubstituted aldehydes are feasible reactants, however, practically speaking, saturated aliphatic aldehydes containing 1–4 carbon atoms and polymers thereof, e.g. paraldehyde are used. Specific examples are formaldehyde, formalin, paraformaldehyde, acetaldehyde, propionaldehyde, butyraldehyde, trioxymethylene, and trioxane. Formaldehyde and paraformaldehyde are preferred because of availability and handling ease. The aldehyde is used in amounts ranging from 1.0 to 10 weight percent based on the oil charged.

The $BF_3$-acid complex employed as catalyst for the reaction is prepared by bubbling $BF_3$ into the formic or acetic acid. When acetic acid is used as the acid component, it is preferably used as glacial (100%) acetic acid, although concentrations of 70 to 100 percent acid are suitable. When formic acid is used as the acid component, it preferably contains from 1 to 30 percent water, but other concentrations can be used if desired. Ninety percent formic acid is the most preferred acid concentration. The acid serves both as a catalyst component and as a solvent. Other materials may be used as solvents. Acetic acid can be used as a solvent with the $BF_3$-formic acid catalyst complex and vice versa. The total acid (catalyst and solvent) is used in amounts ranging from .1 to 50 percent based on the weight of oil charged. The acid complex is preferably used in amounts ranging from .1 to 20 weight percent based on the oil charged. The mol ratio of $BF_3$ to acid in the complex can vary from 1:1 to 1:3. A mol ratio of about 1:2 is preferred.

$BF_3$ may be dissolved in the acid either before or after the acid has been placed in the reactor. In forming the complex $BF_3$ is bubbled through the acid at ambient temperature, and the complex is ready for use. The $BF_3$ is used in amounts ranging from 0.03 percent to 3 percent, based on the weight of the oil charged.

The catalyst used for effecting the present reactions can be recovered and re-used. The acid and water are distilled off first and then the $BF_3$ acid complex leaving organic matter as residue. In doing this for a commercial operation, means should also be provided for removing from the acid the water formed in the reaction. This can be done by azeotropic distillation employing a suitable azeotroping agent or by other means. The concentrated acid can then be blended with the $BF_3$-acid complex and the mixture can be re-used.

Both acetic acid and formic acid complexes with $BF_3$ are excellent catalysts for the reaction. However, the acetic acid-$BF_3$ complex in acetic acid as solvent is the better system for continuous operation including catalyst recovery and recycle and is preferred for these reasons.

In accordance with our invention the condensation reaction can be carried out at temperatures between 10 and 200° C. and preferably between 80 and 150° C. The temperature range between 140–150° C. is particularly suitable when the reaction is conducted at elevated pressure. Pressures of 10 to 250 p.s.i.a. can be used with the preferred range being —14 to 120 p.s.i.a. Reaction times can vary from less than 10 minutes to 10 hours. Excellent batch runs can be made in 30 minutes, and the process is adaptable to continuous operation with reaction times less than 30 minutes.

The amount and type of resin produced is dependent on the type of aromatic feedstock, the amount of aldehyde, reaction conditions, catalyst concentration, and the character of the distillation. The feedstock can be treated to remove color bodies, sulfur, and metals, if desired. One of the advantages of the present process is the relatively light color of the resin produced from dark, heavy petroleum feed-stocks without the necessity for pre-treatment or after treatment. After-treatment may be used to make still lighter products, if desired.

Pressure runs were made in a stirred, heated stainless steel reactor having a design pressure of about 1200 p.s.i. Uniform heating was obtained by the use of heating coils wrapped around the reactor. Heating was controlled by a pyrometer operatively connected to a bayonet-type thermocouple immersed in the reaction medium. After the reactor was closed and tested, $BF_3$ was passed in through an inlet valve. A mixture of formaldehyde and acid was fed into an evacuated blowcase and from the latter into the reactor. Agitation was supplied by a motor-driven stirrer. After the reaction was complete, the contents of the reactor were withdrawn through a cooling coil.

Atmospheric runs were made in a conventional glass reactor equipped with a stirrer and reflux condenser. $BF_3$ was complexed with the acid in a separate reaction, and the complex added as such to the glass reactor.

Separation was accomplished by phase separation and distillation. Hot settling at about 90° F. provided the best stratification of the oil and resin and acid layers. A water wash can be used at this point. The oil and resin layer was distilled at 5 mm. pressure to 180° C. to recover the oil. The endpoint was about 650° F. at atmospheric pressure. The resin fractions were separated by vacuum distillation. The acid phase and any portion of the resin phase may be recycled, if desired.

The various embodiments of the invention are illustrated by the examples which follow.

In order to demonstrate the process when the primary object is to prepare resins, specific examples are presented in the following table. The first ten runs were made in a pressure reactor in the manner discussed previously. The remainder of the runs were made at atmospheric pressure in a glass reactor. The charge stock in each case was 500 ml. gas oil from catalytic cracking containing 33.7 percent gel aromatics and having a boiling range of 440 to 650° F. or, if other amounts of oil were used, the results were converted to a basis of 500 ml. Twenty grams of paraformaldehyde was used. Catalyst and conditions are given for each run. In each example the boiling range of the liquid was 651–814° F., the boiling rnge of the intermediate resin was 814–944° F., and the final resin was the residue boiling above 944° F.

*Table I.—Effect of varying catalyst and reaction time in pressure runs*

| Run No. | Catalyst | Reaction Conditions | | | Products | | | | | | | Grams Intermediate and Hard Resin [a] | Gms. Total Prod. >650° F. |
| --- | --- | --- | --- | --- | --- | --- | --- | --- | --- | --- | --- | --- | --- |
| | | Temp., °C. | Pressure p.s.i.g. | Hrs. | Liquid ml. | Intermediate | | | Final Resin | | | | |
| | | | | | | Gms. | Ring and Ball, °C. | App.[b] | Gms. | Ring and Ball, °C. | App.[b] | O.D. Clr.[c] | |
| 1a | 90% Formic, 125 ml | 145 | 108-125 | 2 | 58.5 | 37 | -------- | 5D | 32.8 | 137 | 6E | 89 | 69.8 | 128 |
| 2a | 90% Formic, 125 ml | 145 | 100 | 0.5 | 24 | 37 | -------- | 6D | 16.4 | 133 | 6F | 14 | 53.4 | 77 |
| 3a | 90% Formic, 125 ml.; BF₃, 1.8 g. | 145 | 125-157 | 2 | 36.5 | 42.6 | -------- | 5C | 49.5 | 133 | 6E | 85 | 92.1 | 127 |
| 4a | 90% Formic, 125 ml.; BF₃, 1.8 g. | 145 | 93-118 | 0.5 | 39.5 | 43 | -------- | 5C | 61.9 | 125 | 6E | 20 | 104.9 | 144 |
| 5a | 90% Formic 125 ml.; BF₃, 1.8 g. | 145 | 95-119 | 0.5 | 39 | 21 | -------- | 3C | 77.0 | 108 | 6E | -------- | 98.0 | 137 |
| 6a | Glacial Acetic Acid, 125 ml. | 180 | 80-135 | 2 | 17 | -------- | -------- | -------- | 0.5 | -------- | 6G | -------- | -------- | 15 |
| 7a | Acetic Acid, 125 ml.; BF₃, 1.8 g. | 145 | 80-92 | 2 | 48 | 20 | 73 | 6D | 13.6 | 108 | 6G | 65 | 33.6 | 80 |
| 8a | Acetic Acid, 125 ml.; BF₃, 9 g. | 145 | 88 | 2 | 48 | 29 | 67 | 5D | 58 | 144 | 6F | 62 | 87 | 135 |
| 9a | Acetic Acid, 125 ml.; BF₃, 1.8 g. | 185 | 80-120 | 2 | 51 | 21 | <55 | 4C | 56 | 134 | 6F | 84 | 77 | 128 |
| 10a | BF₃, 1.8 g. | 180 | 80-100 | 2 | 35 | 5.5 | <55 | 3D | 8 | 119 | 6F | 67 | 13.5 | 48 |
| 11a | Formic Acid, 14.4 g.; BF₃, 10.6 g.; plus 106 ml. Formic Acid. | 102 | Atm. | 6 | 27 | 17 | 55 | 5B | 56 | 130 | 6D | 4.1 | 73 | 100 |
| 12a | Formic Acid, 14.4 g.; BF₃, 10.6 g.; plus 106 ml. Formic Acid. | 102 | Atm. | 0.5 | 30.7 | 34.7 | 55 | 5B | 68 | 130 | 6D | 8.5 | 102.7 | 133 |
| 13a | Formic Acid, 2.4 g.; BF₃, 1.8 g.; plus 122 ml. Formic Acid. | 102 | Atm. | 0.5 | 29.2 | 40.7 | 59 | 5B | 43.5 | 128 | 6E | 18 | 84.2 | 113 |
| 14a | Formic Acid, 14.4 g.; BF₃, 10.6 g.; plus 106 ml. Formic Acid. | 102 | Atm. | 2 | 34.1 | 73.1 | -------- | 2B | 61.6 | 122 | 6E | 31 | 134.7 | 169 |
| 15a | Formic Acid, 10.6 g.; BF₃, 10.6 g.; plus 114 ml. Acetic Acid. | 108 | Atm. | 0.5 | 23.5 | 22.0 | 50 | 4C | 73 | 124 | 6E | -------- | 95 | 119 |

[a] 100 g. corresponds approximately to 22% based on Gas Oil Charge.
[b] Appearance Code:
  1—liquid.    A—water white, clean.
  2—viscous liquid.    B—light yellow, clean.
  3—soft plastic.    C—yellow, clean.
  4—plastic (easily indented).    D—deep yellow, clean.
  5—hard plastic.    E—brown.
  6—brittle.    F—dark brown.
                  G—black.

[c] $\text{O.D. Color} = \dfrac{(\text{Absorbance at 525 m}\mu)\times 100}{(\text{Conc. (Wt. percent)})\times \text{Cell thickness (cm.)}}$

[d] In run 14 the oil charge was of a boiling range of 440° to 900° F.

[e] In run 6 of the oil charged contained 41.8% aromatics by gel.

Runs 3a to 5a show that the quantity of product is materially increased and that the product is of a lighter color when the formic acid-BF₃ complex is used instead of formic acid (Runs 1a and 2a) or BF₃ (Run 10a) alone. Runs 7a, 8a, and 9a show the superiority of the acetic acid-BF₃ complex over acetic acid alone (Run 6a).

Runs 11a to 15a show that good resins can be made at atmospheric pressure.

Runs 4a, 5a, 12a, 13a, and 15a show that good results are obtained using short reaction times.

Run 15a shows that glacial acetic acid can be used in conjunction with a formic acid-BF₃ complex.

The petroleum resins of this embodiment of the invention or fractions thereof can be used as adhesives, plasticizers, binders, and sizing. They may also be used as components in rubber compounds, adhesives, insulation, tile, paint, varnish, and the like.

The embodiment of the process wherein aromatics are removed from jet fuel is illustrated by the examples set forth in Table II below.

The feed for Runs 1b–4b was a distillate fraction from petroleum refining operations having a boiling range of 440–515° F., an aromatic content of 11.4% (by acid treat), a freezing point of −18° F., a specific gravity @ 60° F. of .8128, a smoke point of 28.

The feed for Runs 5b and 6b was a jet fuel having the following properties:

B.R. ° F. _____ 370° to 480° F.
Percent arom. by gel. _____ 14.4
Percent dicyclic aromatics by U.V. _____ 0.5
Freeze point _____ −54° F.
Smoke point _____ 24
Spec. gr. @ 60° F. _____ 0.8081

3000 ml. of the charge stock and 500 ml. of 90% formic acid were placed in a 5-liter reaction vessel equipped with stirring and heating means. 120 g. of paraformaldehyde were added, with stirring and the mixture heated to 90° C. The BF₃-formic acid complex (64 gm. BF₃/225 ml. 90% formic acid) was added in increments. The complex is made by passing gaseous BF₃ into a chilled formic acid solution. At least two moles of formic acid are used per mole of BF₃-formic acid complex. The preferred procedure is to add the preformed complex to the formolite reaction mixture but in situ preparation can be employed if desired. The reaction began immediately and was continued at a temperature of 95–100° F. for 15 minutes. Heating was stopped and the mixture separated into an upper oil layer and an acid layer. The oil was decanted and reacted again in a second pass under the same conditions with fresh solvent, aldehyde and complex. The oil layer was decanted and washed with hot water until the wash water was no longer acid. The oil was distilled under a vacuum of 5–50 mm. Hg to strip off the jet fuel fraction which had an end point of 515° F.

Table II

| Run No. | Charge | Process Conditions | Boiling Range | Jet Fuel Product | | Monocyclic Aromatics | Dicyclic Aromatics | Resin Product, Wt. Percent |
|---|---|---|---|---|---|---|---|---|
| | | | | Wt. Percent | Smoke Pt.[1] | | | |
| 1b | 440-515° F. Distillate Fraction | 2 pass, 64 gms. BF₃ | 418-515 | 83.2 | 35 | 2.3 | 0.2 | 15.9 |
| 2b | ___do___ | ___do___ | 441-521 | 86.3 | 35 | 0.8 | .01 | 10.8 |
| 3b | ___do___ | 2 pass, 10 gms. BF₃ | 441-521 | 91.7 | 35 | 4.1 | 0.03 | 7.9 |
| 4b | ___do___ | 4 pass, 10 gms. BF₃ | 432-524 | 91.0 | | 1.5 | 0.01 | 9.9 |
| 5b | JP-5 | 2 pass, 10 gms. BF₃ | 323-470 | 85.5 | 35 | | 0.03 | 13.3 |
| 6b | ___do___ | 4 pass, 10 gms. BF₃ | 328-470 | 84.6 | 35 | 7.4 | 0.01 | 14.9 |

[1] Test by ASTM D-1322-59t.

The jet fuel fraction produced in the process is very low in aromatics, particularly in dicyclic aromatics. A feed stock containing 5–30 vol. percent aromatics can be treated to produce an improved fuel containing 1 to 10 vol. percent aromatics or less. The end point of the fuel cut from the reaction mixture can be from 450–550° F., preferably from 470–520° F. The smoke point of the treated fuel is improved by at least 5 units and jet fuels having a smoke point of at least 35 units can be produced consistently.

The resin fraction produced has properties varying over a wide range including light and dark colored liquids and solid resins of different viscosities. The resin fraction will have a boiling range of from about 450–950+° F. Generally, the cuts boiling above about 900° F. are solids. The lower molecular weight fractions (250–350) boiling in the range of from about 500–900° F. are most suitable for plasticizers. This fraction can be divided into any number of narrow cuts. The resin fraction can contain from 5 to 15% bound oxygen.

The formolite reaction product (i.e. the 515° F.+ fraction) was divided into cuts 2–5 and bottoms as shown below.

| Cut No. | Boiling Range | Wt. percent | Appearance |
|---|---|---|---|
| 1 | To 515° F | 83.2 | Clear liquid. |
| 2 | 516-806 | 10.6 | Lt. yellow liquid. |
| 3 | 807-814 | 0.5 | Viscous lt. yellow liquid. |
| 4 | 815-899 | 2.1 | Very viscous liquid. |
| 5 | 900-944 | 0.4 | Dark solid. |
| Bottoms | 944 | 2.4 | Do. |

The material boiling in the range of about 516–900° F. was redistilled at 1.0 mm. Hg vacuum and two narrow cuts were separated for testing as plasticizers for polyvinyl chloride.

Cut A had the following properties:

Mol. wt.—281, elemental analysis (wt. percent)—oxygen—11.14, carbon—77.19, hydrogen—11.21, total—99.54, percent aromatics plus non-hydrocarbons—86.4%, $d_4^{20}$—.9491, kinematic viscosity @ 100° F.—12.88.

Cut B had the following properties:

Mol. wt.—344, elemental analysis (wt. percent)—oxygen—9.30, carbon—80.25, hydrogen—9.92, total—99.47, percent aromatics plus non-hydrocarbons—96.1, $d_4^{20}$—1.0041, kinematic viscosity @ 100° F.—258.9, kinematic viscosity @ 210° F.—13.60.

It should be noted that both cuts contain relatively large amounts of bound oxygen. Infra red data confirms the presence of ester linkages and this configuration enhances the effectiveness of the resin cuts as plasticizers.

The compounding formulation was:

|  | Parts |
|---|---|
| PVC | 58.6 |
| Lead carbonate | 0.95 |
| Stearic Acid | 0.45 |
| Dioctyl Phathlate | 20.00 |
| Cut A or B | 20.00 |
|  | 100.00 |

The milling temperature was 305° F. The properties of the plasticized product are shown below.

Table III

| Plasticizer | Control (40 parts DOP) | Cut A 550-680° F. 20 parts | Cut B 680-820° F. 20 parts |
|---|---|---|---|
| Volatility, percent loss 3 hrs. at 100° C. (film) | Nil | 4.9 | 0.9. |
| Heat stability (150° C.): | | | |
| Color after milling | White | White | Cream. |
| After 7 hours | Cream | Cream-tan | Yellow-tan. |
| U.V. Stability (12 hours art. lt.) | ___do___ | Cream-yellow | Yellow. |
| Brittle Point | -33 | -34 | -11. |
| Compatibility | Good | Good | Good. |

The following embodiment describes the removal of undesired aromatics from a lubricating oil fraction.

The lubricating oil fraction which is to be refined is first blended with a gas oil boiling mainly below the range of the lubricating oil stock, e.g., 450–650° F. The gas oil can be either a cracked stock or straight run gas oil. The blend is then reacted with formaldehyde, which can be used in the form of paraformaldehyde if desired, in the presence of a catalyst comprising a complex of boron trifluoride with either formic acid or acetic acid, the complex being dissolved in excess acid. The formaldehyde under the influence of the BF₃-acid complex reacts with various aromatic components of both the lubricating oil and the gas oil. Undesirable components of the lubricating oil are converted to resins which boil higher than the unreacted lubricating oil. Some of the aromatic components of the gas oil are converted into compounds which boil in the lubricating oil range and which are desirable lubricating oil components. Other gas oil aromatics may be converted into high boiling resins. After completion of the reaction, the acid layer containing the complex is separated from the hydrocarbon layer and the latter can be washed with water to remove traces of the acid and complex. The treated hydrocarbons are finally distilled to remove gas oil hydrocarbons and lubricating oil hydrocarbons separately and leave the high boiling resins as residue.

The following examples illustrate this embodiment more specifically:

EXAMPLE 1C

The starting materials were a naphthenic lubricating oil having a boiling range of 756–930° F. and an aromatic content of 40% by weight, and a catalytic gas oil having a boiling range of about 450–650° F. and an aromatic content of 33.7% by weight. These were blended in a proportion of 15% lubricating oil and 85% gas oil. A catalyst solution was prepared by bubbling BF₃ into 700 ml. of 90% formic acid until 64 g. of BF₃ had been absorbed. Additional formic acid was added to bring the total volume to 750 ml. The solution was placed in a reactor provided with a stirrer and a reflux condenser, together with 3000 ml. of the oil blend and 120 g. of paraformaldehyde. The mixture was heated to refluxing temperature (104° C.) and allowed to react for 2 hours while being stirred. Thereafter the mixture was allowed to stratify, the catayst layer was drawn off and the hydrocarbon layer was washed twice with water. The mixture was then distilled to obtain a cut boiling in the gas oil range, a lubricating oil cut boiling in the range of 650–938° F. and a bottom resin fraction boiling above 938° F. The yields of these cuts based on the charge oil blend were, respectively, 54.1%, 29.2% and 16.7%. Thus, the treatment increased the volume of lubricating oil by a factor of 1.94. The refined gas oil was water white, the lubricating oil product was light yellow, and the resins were dark reddish brown and had a Ring and Ball melting point of 122° C. Comparative tests for the original lubricating oil and the lubricating oil product were as follows:

|  | Original | Product |
|---|---|---|
| Kinematic Visc. at 100° F., CS | 485 | 1,020 |
| Kinematic Visc. at 210° F., CS | 16.1 | 19.8 |
| Density, $d_4^{20}$ ° C | 0.948 | 0.981 |
| Viscosity-gravity constant | 0.894 | 0.935 |
| Refractive index, $nd^{20}$ ° C | 1.5229 | 1.5483 |
| Refractivity Intercept | 1.0491 | 1.0576 |
| Molecular weight | 420 | 385 |
| O.D. Color | 34.3 | 14.1 |
| Carbon analysis: |  |  |
| Aromatic C, percent | 22 | 33 |
| Naphthenic C, percent | 41 | 39 |
| Paraffinic C, percent | 37 | 28 |

From the carbon analysis and the refractive indexes it can be seen that the lubricating oil product was substantially more aromatic than the original oil.

EXAMPLE 2C

When the gas oil and lubricating oil stocks of the preceding example were blended in a proportion of 75% lubricating oil to 25% gas oil and the blend was treated in the same manner as in the preceding example, a light yellow refined lubricating oil was obtained in a yield of 86% based on the lubricating oil charged. Analysis of this product showed that 19% of the carbon atoms were aromatic carbons and the viscosity-gravity constant was 0.885.

EXAMPLE 3C

This run was made in the same manner as described in Example 1C except that the reaction time was only 15 minutes and a lighter lubricating oil was used. The proportion of lubricating oil in the charge blend was 15% by volume. The lubricating oil had an aromatic content of 42% by weight, a boiling range of 590–770° F., K.V. @ 100° F. of 22.6 cs. and K.V. @ 210° F. of 3.87. Upon working up the product, a refined lubricating oil product having a boiling range of 590–932° F. was obtained in a yield of 215% based on the lubricating oil charged. This product had a light yellow color, K.V. @ 100° F. of 25.9 and K.V. @ 210° F. of 3.91 cs. Its average molecular weight was 310 as compared to 329 for the oil charged. The refined lubricating oil product had a viscosity-gravity constant of 0.884 and refractivity intercept of 1.0574, as compared to values of 0.884 and 1.0489, respectively, for the lubricating oil charge.

The refined lubricating oil obtained in the foregoing embodiment has a light yellw color and exceptionally good color stability and generally is somewhat more aromatic than the lubricating oil charge stock. A part of it is derived from the gas oil as a result of molecular weight increase due to coupling of gas oil aromatics through methylene groups derived from the formaldehyde. The yield of the refined lubricating oil depends upon the amount of gas oil hydrocarbons that are converted to products in the lubricating oil range. Hence the yield of refined oil for a given amount of lubricating oil stock can be varied by varying the proportion of gas oil to lubricating oil in the blend that is treated. As a general rule, if a major amount of gas oil is included in the blend, the amount of refined lubricating oil obtained will be greater than the amount of lubricating oil stock treated. Depending upon the desired yield and composition of the lubricating oil product, the proportion of gas oil blended with the lubricating oil charge can be varied from 10:90 to 90:10 on a volume basis. Preferably a catalytic gas oil is used in practicing this embodiment.

The treated gas oil hydrocarbons which are not converted to lubricating oil material or to resins generally are water white and have excellent stability. They are particularly useful as high grade fuel oil.

The resinous material obtained in the reaction can be distilled to obtain various distillate grades of resins ranging from viscous oils to brittle solids. These generally all have a light yellow color. The residue is a reddish brown brittle solid. These resins have various special uses, mentioned previously.

It is to be understood that the invention is not limited to the specific examples contained in this specification for illustration but rather is limed only by the scope of the claims.

The invention claimed is:

1. A process which comprises contacting a hydrocarbon fraction containing aromatic hydrocarbons of 1 to 3 aromatic rings, said fraction boiling in the range of from about 150° F. to 1,100° F. with an aldehyde which condenses with aromatic hydrocarbons to form aromatic resins in the presence of a catalyst complex comprising $BF_3$ and an acid selected from the group consisting of acetic acid and formic acid at a temperature in the range of from 10 to 200° C. and a pressure in the range of from 10 to 250 p.s.i.a. and separating the aromatic resin from the unreacted hydrocarbon fraction.

2. A process which comprises contacting an aromatic hydrocarbon fraction containing aromatic hydrocarbons of 1 to 3 aromatic rings boiling in the range of from about 150° F. to 1,100° F. with an aldehyde which condenses with aromatic hydrocarbons to form aromatic resins in the presence of a catalyst complex comprising formic acid and $BF_3$ at a temperature in the range of from 10 to 200° C. and a pressure in the range of from 10 to 250 p.s.i.a. and separating the aromatic resin from the unreacted hydrocarbon fraction.

3. The process according to claim 2 in which the aromatic hydrocarbon fraction is a gas oil derived from a catalytic cracking operation.

4. The process according to claim 2 in which the catalyst complex is formed by bubbling $BF_3$ through formic acid having a concentration of 70–99 percent acid.

5. A process which comprises contacting a catalytic gas oil boiling in the range of 450 to 650° F. and containin aromatic hydrocarbons of 1 to 3 aromatic rings with formaldehyde to form aromatic resins in the presence of a catalyst complex consisting essentially of formic acid and $BF_3$ at a temperature in the range of from 80 to 150° C. and a pressure in the range of from 14 to 120 p.s.i.a. and separating the aromatic resin from the unreacted catalytic gas oil.

6. A process which comprises contacting an aromatic hydrocarbon fraction containing aromatic hydrocarbons of 1 to 3 aromatic rings and boiling in the range of from about 150° F. to 1,100° F. with an aldehyde which condenses with aromatic hydrocarbons to form aromatic resins in the presence of a catalyst complex comprising glacial acetic acid and $BF_3$ at a temperature in the range of from 10 to 200° C. and a pressure in the range of from 10 to 250 p.s.i.a. and separating the aromatic resin from the unreacted hydrocarbon fraction.

7. The process according to claim 6 in which the aromatic hydrocarbon fraction is a gas oil derived from a catalytic cracking operation.

8. The process according to claim 6 in which the catalyst complex is formed by bubbling $BF_3$ through glacial acetic acid.

9. A process which comprises contacting an aromatic hydrocarbon fraction containing aromatic hydrocarbons of 1 to 3 aromatic rings boiling in the range of from 150° F. to 1,100° F., an aldehyde which condenses with aromatic hydrocarbons, and an acetic acid solvent to form aromatic resins in the presence of a catalyst complex consisting essentially of acetic acid and $BF_3$ at a temperature in the range of from 80 to 150° C. and a pressure in the range of from 14 to 120 p.s.i.a. and separating the aromatic resin from the unreacted hydrocarbon fraction.

10. A process for improving the smoke point and lowering the aromatic hydrocarbon content of gas turbine and jet fuels comprising treating said fuels with an aldehyde in the presence of a catalyst complex comprising $BF_3$ and an acid selected from the group consisting of acetic acid and formic acid to form resinous aromatic condensation products, separating the resinous condensation products and recovering a fuel having a smoke point of at least 35.

11. A process which comprises treating a paraffinic hydrocarbon fraction boiling in the range of from about 125° F. to about 600° F. containing less than 25 vol. percent aromatic hydrocarbons with an aldehyde which condenses with aromatic hydrocarbons to form resinous aromatic condensation products in the presence of a catalyst complex comprising $BF_3$ and an acid selected from the group consisting of acetic acid, formic acid and mixtures thereof at condensation conditions, separating an improved fuel for gas turbine and jet engines having an end point in the range of 450–550° F. from the higher boiling portion of the reaction product, and separating a liquid resin fraction boiling in the range of from 500 to 900° F. from the higher boiling solid resin fraction said liquid resin fraction being suitable for use as a light colored plasticizer.

12. Method of refining lubricating oil which comprises blending a lubricating oil fraction with a gas oil, reacting the blend with formaldehyde in the presence of a catalyst comprising a complex of $BF_3$ and an acid selected from the group consisting of acetic acid and formic acid, the complex being dissolved in excess acid, separating the complex and acid from the treated hydrocarbons, and distilling the treated hydrocarbons to separate a refined lubricating oil from lower boiling hydrocarbons and from higher boiling resins.

13. Method of refining and synthesizing lubricating oil which comprises blending a minor amount of a lubricating oil fraction with a major amount of gas oil, reacting the blend with formaldehyde in the presence of a catalyst comprising a complex of $BF_3$ and an acid selected from the group consisting of acetic acid and formic acid, the complex being dissolved in excess acid, separating the complex and acid from the treated hydrocarbons, and distilling the treated hydrocarbons to recover a refined lubricating oil fraction in amount greater than the amount of lubricating oil fraction originally charged.

References Cited by the Examiner
UNITED STATES PATENTS

| | | | |
|---|---|---|---|
| 2,018,715 | 10/35 | Fulton | 208—291 |
| 2,382,184 | 8/45 | Thompson | 260—67 |
| 2,392,570 | 1/46 | Berger et al. | 208—256 |
| 2,495,852 | 1/50 | Lien et al. | 208—291 |
| 2,660,572 | 11/53 | Feasley | 260—67 |
| 2,834,717 | 5/58 | Shiah | 208—291 |
| 3,000,859 | 9/61 | Mirviss et al. | 260—67 |
| 3,025,260 | 3/62 | Luck et al. | 260—67 |
| 3,114,732 | 12/63 | Brachel et al. | 260—67 |
| 3,116,265 | 12/63 | Huang et al. | 260—67 |

OTHER REFERENCES

Ellis: The Chemistry of Synthetic Resins, vol I; Reinhold Publishing Corp., New York (1935), TP 978.E5; pp. 211–214.

ALPHONSO D. SULLIVAN, *Primary Examiner.*